United States Patent [19]

Yagi

[11] 4,183,230

[45] Jan. 15, 1980

[54] CENTRIFUGAL GOVERNOR FOR ENGINE IGNITION SYSTEM

[75] Inventor: Yoshikazu Yagi, Anjo, Japan

[73] Assignee: Nippondenso Co., Ltd., Kariya, Japan

[21] Appl. No.: 926,116

[22] Filed: Jul. 19, 1978

[30] Foreign Application Priority Data

Aug. 10, 1977 [JP] Japan .................. 52-106944[U]

[51] Int. Cl.² ................. H01H 19/62; F02D 5/04; F16D 5/00
[52] U.S. Cl. ................. 64/25; 123/117 R; 123/146.5 A; 200/31 R; 200/31 CA
[58] Field of Search ......... 64/25; 123/117 R, 146 SA, 123/146.5 R, 139 AP; 200/31 R, 31 A, 31 CA

[56] References Cited

U.S. PATENT DOCUMENTS

| | | | |
|---|---|---|---|
| 2,008,647 | 7/1935 | Schneider | 200/31 CA |
| 2,549,750 | 4/1951 | Spengler | 64/25 |
| 3,320,770 | 5/1967 | Bevacqua | 64/25 |
| 3,482,559 | 12/1969 | Salomon | 123/146.5 R |
| 3,715,528 | 2/1973 | Habert | 64/25 |
| 3,923,028 | 12/1975 | Campbell | 123/146.5 A |
| 3,942,492 | 3/1976 | Iguchi | 200/31 CA |
| 3,964,456 | 6/1976 | Eshelman | 64/25 |
| 4,030,467 | 6/1977 | Schild | 123/146.5 A |

*Primary Examiner*—Charles J. Myhre
*Assistant Examiner*—R. C. Turner
*Attorney, Agent, or Firm*—Cushman, Darby & Cushman

[57] ABSTRACT

A pair of centrifugal governor are combined in an unit for providing a compound spark advance characteristics.

A second advance cam and a pair of weights are placed above a first advance cam and a pair of weights. All weight support pins and additional pair of spring support pins extend from the second advance cam so that all the governor springs for the both centrifugal governors are disposed on the second cam plate to connect the weight support pins and spring support pins, thereby connecting the cam and weights. As a result, a compact and easily adjustable centrifugal governor unit is obtained.

3 Claims, 4 Drawing Figures

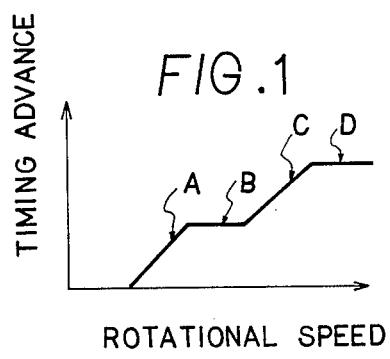
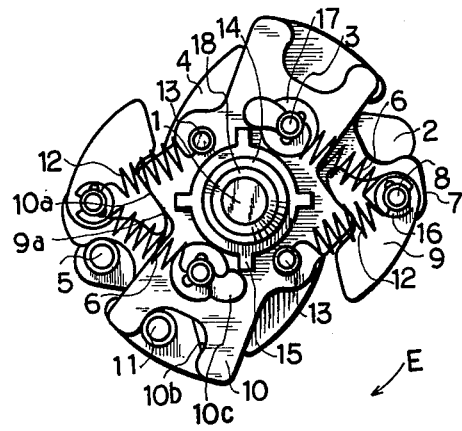
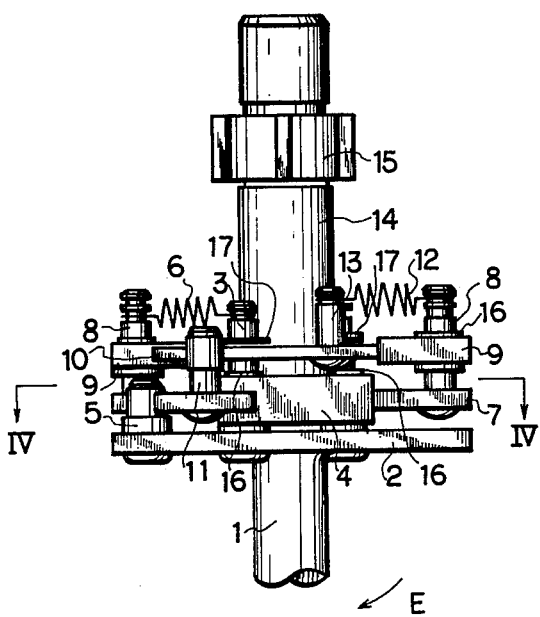
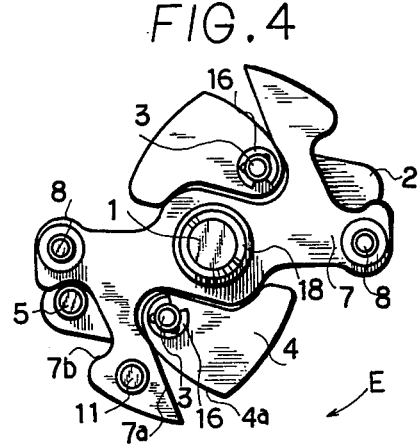

CENTRIFUGAL GOVERNOR FOR ENGINE IGNITION SYSTEM

BACKGROUND OF THE INVENTION

This invention relates to an improved construction of a centrifugal governor having two-step spark advance characteristics for an ignition distributor of an internal combustion engine.

SUMMARY OF THE INVENTION

A main object of the present invention is to provide a compact two-step centrifugal spark advancer.

Another object of the present invention is to provide a two-step centrifugal spark advancer which is convenient for adjustment and massproduction.

BRIEF DESCRIPTION OF THE DRAWINGS

FIG. 1 is a graph showing spark advance characteristic curve of the two-step centrifugal spark advancer according to the present invention, FIG. 2 is a plan view of an embodiment according to the present invention, FIG. 3 is a side view of the embodiment shown in FIG. 2 and FIG. 4 is a plan view taken along line IV—IV of FIG. 3.

DESCRIPTION OF A PREFERRED EMBODIMENT

An embodiment according to the present invention will be explained with reference to the attached drawings; in which a drive shaft 1 is connected with an engine to be rotated in a direction indicated by arrow E and a weight carrying plate 2 is secured to the drive shaft 1 to be rotated therewith.

The weight carrying plate 2 has a couple of first weight support pins 3 for carrying first weights 4 and a stopper pin 5 upstanding therefrom. The first weight 4 has a cam portion 4a and a bore for receiving the support pin 3. The weight 4 is fixed by a snap ring 16 and pivoted around the pin 3. A first advance cam plate 7 is placed by the weight carrying plate 2 and has a couple of second weight support pins 8, a stopper pin 11 respectively upstanding therefrom and a shaft portion 18 as shown in FIG. 4. A second weight 9 has a cam portion and a bore which receives the support pin 8 being fixed by a snap ring 16, and is pivoted around the support pin 8. The shaft portion 18 has a bore which receives the drive shaft 1 to be rotatably carried thereby. The first advance cam plate 7 has a couple of dents or internally curved cam portions 7a with which the respective cam portions of the first weights 4 engage to move same relative to the weight carrying plate in the direction indicated by arrow E under a centrifugal force exerted on the weights 4 according to the rotational speed of the drive shaft 1. The cam plate 7, also, has a shoulder portion 7b on which the stopper pin abuts to restrict further move of the cam plate 7 when the rotational speed of the drive shaft 1 exceeds a predetermined speed. A second advance plate 10 is placed by the first advance plate and has a couple of spring support pins 13 upstanding therefrom and a shaft portion 14 having a bore which rotatably receive the outer periphery of the shaft portion 18 to be carried thereby. A magnetic inductive rotor 15 is secured to the shaft portion 14 to change the reluctance of a magnetic circuit in which a well known pick up circuit is disposed. The second plate has a couple of dents or internally curved cam portions 10a and a shoulder 10b. The respective cam portion of the second weights 9 contact the cam portion 10a to urge same in the direction of arrow E under a centrifugal force exerted on the weights 9 when the rotational speed of the drive shaft 1 exceeds a predetermined speed. When the speed of the drive shaft 1 further increases and exceeds another predetermined speed, the shoulder 10b comes into contact with the stopper pin 11, and the second cam plate 10 is stopped further displacement relative to the first cam plate 7. The second advance cam plate 10 also has a couple of arcuate openings 10c which receive the second weight support pins 8, whereby the cam plate 10 can rotate relative to the pins 8 within an angle decided by the arcuate openings 10.

The first weight support pin 3 has, on its free end, an annular groove in which one end of a first coil spring 6 is secured. The second weight support pin 8 has, on its free end, two lines of annular grooves, in one of which the other end of the coil spring 6 is secured. The spring support pin 13 also has, on its free end, a same kind of annular groove in which is secured one end of a second coil spring 12, the other end of which is in turn secured to the other annular groove of the second weight support pin 8. The second spring 12 has a stronger spring action than the first spring 6.

The first weight support pin 3 has another annular grooves for the snap ring 16 for retaining the weight 4 and for another snap ring 17. The snap ring 17 retains the second cam plate 10 in position. It should be noted that the first and second coil springs 6 and 12 are disposed in a same plane on the second cam plate 10 and, therefore, the axial length or height of the centrifugal weight and cam mechanism which include the weight carrying plate 2, first and second cam plates 7 and 10 and weights 4 and 9 can be made minimized and, further, the spring force cam be easily adjusted.

When an engine is operated, the drive shaft 1 is driven to rotate, and first and second weights 4 and 9 are subjected to centrifugal force. As the rotational speed increases the first weight 4 rotates clockwise against the spring 6 with respect to the weight support pin 3 push the first advance cam plate 7 at the cam portion 7a so that the cam plate 7 rotates clockwise (as shown by arrow E) until the shoulder 7b abuts the stopper pin 5. As a result the inductor rotor 15 rotates to cause ignition timing advance as indicated by A in the curve shown in FIG. 1. Thereafter, the ignition timing is kept constant until the rotational speed reaches a predetermined speed as shown by B in the FIG. 1 curve.

When the rotational speed increases further, the second weights prevail over the second springs 12 and open their wings thereby pushing the second cam plate 10 at the cam portion 10a so that the inductor rotor 15 further rotates with respect to the drive shaft 1. As a result, the ignition timing is advanced further as shown by the curve C in FIG. 1 until the shoulder 10b of the second cam plate 10 is stopped by the stopper pins 11.

In case the rotational speed further increases, the ignition timing is not advanced as indicated by D in FIG. 1.

What is claimed is:

1. A centrifugal governor for an ignition distributor of an internal combustion engine comprising:

a drive shaft for transmitting engine rotation, said drive shaft having a weight carrying plate secured to said drive shaft to rotate therewith and a couple of first weight support pins secured thereto, a first advance cam rotatably carried by said drive shaft and disposed on said weight carrying plate, said cam having a couple of second weight support pins secured thereto, a couple of first weights pivotally supported by said first weight support pins and disposed to engage with said first advance cam so that as speed increases above a first predetermined speed said first weight causes said first advance cam to move relative to said drive shaft, a second advance cam rotatably carried by said drive shaft and disposed on said first advance cam, last said cam having a couple of spring support pins, a couple of arcuate openings through which said first support pins extend and spark signal generating means secured thereto, said first and second cam support pins and said spring support pins extend from said second advance cam, a couple of second weights pivotally supported by said second support pins and disposed to engage with said second advance cam so that as speed increases above a second predetermined speed, said second weight causes said second advance cam to move relative to said drive shaft, a couple of first spring disposed on said second advance cam for resiliently connecting said first cam support pin and said second cam support pin to provide spring force against the movement caused by said first weight, a couple of second springs disposed on said second advance cam for resiliently connecting said second cam support pin and said spring support pin to provide spring force against the movement caused by said second weight, whereby said second weight support pins carry said first and second springs.

2. A centrifugal governor according to claim 1 further comprising a first stopper pin secured to said weight carrying plate for restricting excessive displacement of said first advance cam and a second stopper pin secured to said first advance cam for restricting excessive displacement of second advance cam relative to said first advance cam.

3. A centrifugal governor according to claim 2, wherein said spark generating means comprises a magnetic inductor for supplying magnetic field.

* * * * *